United States Patent [19]
Kim

[11] Patent Number: 6,115,239
[45] Date of Patent: Sep. 5, 2000

[54] LOCKING MECHANISM FOR PORTABLE COMPUTER

[75] Inventor: Joong-seup Kim, Suwon, Rep. of Korea

[73] Assignee: SamSung Electronics Co., Ltd., Suwon, Rep. of Korea

[21] Appl. No.: 09/089,941

[22] Filed: Jun. 3, 1998

[30] Foreign Application Priority Data

Jun. 3, 1997 [KR] Rep. of Korea ...................... 97-22953

[51] Int. Cl.⁷ .............................. H05K 5/00; H05K 5/04; H05K 1/14; E05C 7/00; E05C 9/00
[52] U.S. Cl. ........................ 361/681; 361/681; 361/683; 361/686; 361/732; 361/740; 292/8; 292/30
[58] Field of Search ................................. 361/683, 681, 361/686, 732, 740; 292/8, 30

[56] References Cited

U.S. PATENT DOCUMENTS

| | | |
|---|---|---|
| 4,294,496 | 10/1981 | Murez . |
| 4,690,439 | 9/1987 | Park ......................................... 292/27 |
| 4,758,031 | 7/1988 | Wolf . |
| 4,838,585 | 6/1989 | Jondrow . |
| 4,901,261 | 2/1990 | Fuhs . |
| 5,011,198 | 4/1991 | Gruenberg et al. . |
| 5,168,429 | 12/1992 | Hosoi . |
| 5,198,966 | 3/1993 | Kobayashi et al. . |
| 5,255,154 | 10/1993 | Hosoi et al. ............................ 361/680 |
| 5,255,515 | 10/1993 | Hosoi et al. . |
| 5,490,036 | 2/1996 | Lin et al. . |
| 5,497,296 | 3/1996 | Satou et al. .............................. 361/681 |
| 5,564,163 | 10/1996 | Lowry et al. ............................. 16/342 |
| 5,576,929 | 11/1996 | Uchiyama et al. . |
| 5,580,107 | 12/1996 | Howell . |
| 5,660,065 | 8/1997 | Edlund . |

Primary Examiner—Gerald Tolin
Assistant Examiner—Tung Minh Bui
Attorney, Agent, or Firm—Robert E. Bushnell, Esq.

[57] ABSTRACT

In a locking mechanism for a portable computer having a main base panel and a display panel pivotally mounted on the base panel, a latch frame is installed to be capable of moving inside the display panel, a plurality of latches are formed on the latch frame at a predetermined interval and one end portion thereof protrudes from the front surface of the display panel, and a latch slide knob operatively connected to the latch frame for concurrently operating the latches. The latches insert into and are locked by latch grooves formed at positions corresponding to the latches on the upper surface of the base panel. Since a plurality of latches are provided and elastic forces are applied by double springs, the display panel of the portable computer is kept stable with respect to the main base panel and is not easily opened by external impacts. In addition, since a plurality of latches are coupled to a single latch frame, the latches can be concurrently operated by a single latch slide so that the opening/closing operation of the portable computer is facilitated.

8 Claims, 6 Drawing Sheets

LOCKING MECHANISM FOR PORTABLE COMPUTER

CLAIM FOR PRIORITY

This application makes reference to, incorporates the same herein, and claims all benefits accruing under 35 U.S.C. §119 from an application for LOCKING DEVICE FOR PORTABLE COMPUTER earlier filed in the Korean Industrial Property Office on Jun. 3, 1997, and there duly assigned Serial No. 22953/1997, a copy of which application is annexed hereto.

BACKGROUND OF THE INVENTION

1. Technical Field

The present invention relates to a locking mechanism for a portable computer, and more particularly, to a locking mechanism for a portable computer having an improved structure so that a plurality of latches are operated by a single latch slide to open a display panel from a base panel of the portable computer.

2. Related Art

Portable computers such as laptop computers and notebook computers have become increasingly popular for general use. The computers of this type comprises a base panel supporting a keyboard and necessary hardware such as a central processing unit (CPU), and a display panel pivotally mounted on the base panel for movement between a closed position when not in use and an open position when in use. The display panel generally supports a flat type of display such as a liquid crystal display (LCD) and is foldable onto the base panel containing the keyboard.

Portability of such computers requires that the display panel and the base panel be securely latched. A latch mechanism is generally provided to secure the display panel to the base panel. Exemplars of different latch mechanisms are disclosed in U.S. Pat. No. 4,294,496 for Portable Computer Enclosure issued to Murez, U.S. Pat. No. 4,758,031 for Retractable Safely Latch For Cases issued to Wolf, U.S. Pat. No. 4,838,585 for Handle Latch Mechanism issued to Jondrow, U.S. Pat. No. 4,901,261 for Retractable Hand And Latch for Portable Computers issued to Fuhs, U.S. Pat. No. 5,011,198 for Handle Latch Assembly issued to Gruenberg et al., U.S. Pat. No. 5,168,429 for Electronic Apparatus Having A Slidable Pawl For Removably Connecting A Display Housing To A Base Housing issued to Hosoi, U.S. Pat. No. 5,198,966 for Apparatus Including A Rotatable Latch Mechanism Having An Attaching Structure For Holding A Movable Member In A Closed Position issued to Kobayashi et al., U.S. Pat. No. 5,255,154 for Portable Electronic Apparatus With A Latch Mechanism Including An Interlock issued to Hosoi et al., U.S. Pat. No. 5,490,036 for Portable Computer With Tiltable Keyboard Structure Having Releasably Engageable Latch Assembly Members Extending Therefrom issued to Lin et al., U.S. Pat. No. 5,497,296 for Electronic Apparatus With Hinged Display And Latch Mechanism For Releasably Latching Display In Closed Position issued to Satou et al., U.S. Pat. No. 5,576,929 for Structure Having A Latch Mechanism Engaging An Intermediate Cover And An Outer Cover And Lifting The Intermediate Cover By Deformation Of Elastic Member issued to Uchiyama et al., U.S. Pat. No. 5,580,107 for Hidden Latch Hook For Portable Personal Computer And The Like issued to Howell, and U.S. Pat. No. 5,660,065 for Portable Computer Locking Device issued to Edlund.

A typical latch mechanism may be constructed a latch member operatively connected to a knob for permitting movement between a latch position when the display panel is folded down flat on the surface of the base panel and when the latch member latches onto a corresponding latch groove, and a release position when the latch member is released from the corresponding latch groove to open the display panel from the base panel. For example, in U.S. Pat. No. 5,497,296 issued to Satou, a pair of latch members are installed at opposite side edges of the display panel and two slide knobs for operating the latch member are installed adjacent to the latch members. In order to open the display panel from the base panel, each of the two slide knobs must be slid in one direction to release the respective latch members from corresponding latch grooves. Both slide knobs installed on opposite sides of the display panel must be manually and simultaneously operated to open the portable computer. This requirement can be burdensome and inconvenient. A single retractable latch mechanism may be used as recently disclosed in U.S. Pat. No. 5,580,107 issued to Howell, to secure the display panel to the base panel. A latch hook is retractable relative to the display panel when the display panel is moved between an open position and a closed position. This latch mechanism, however, can be complex as its movement is a function of force exerted when the display panel is moved between an open position and a closed position. As such, I believe that an improved locking device for portable computers can be contemplated with simpler design and more effective construction.

SUMMARY OF THE INVENTION

Accordingly, it is therefore an object of the present invention to provide an improved locking mechanism for use with a portable computer.

It is also an object to provide a locking mechanism having a plurality of latches for a portable computer to concurrently open a display panel from abase panel of the portable computer by a single slide knob.

These and other objects of the present invention can be achieved by a locking mechanism for a portable computer having a base panel supporting a keyboard and a display panel pivotally mounted on the base panel for movement between an open position when the portable computer is open, and a closed position when the portable computer is closed. The locking mechanism comprises a latch frame installed in the display panel for movement along a widthwise direction of the display panel; and a plurality of latches formed on the latch frame at a predetermined interval and protruding through a front surface of the display panel, and concurrently movable between a latch position for engaging corresponding latch grooves formed on the base panel to enable the display panel to be secured in the closed position, and a release position for disengaging from the corresponding latch grooves of the base panel to enable the display panel to be moved into the open position. A slide knob is operatively connected to the latch frame for sliding the latch frame along the widthwise direction of the display panel to move the latches between the latch position for engaging corresponding latch grooves formed on the base panel to enable the display panel to be secured in the closed position, and the release position for disengaging from the corresponding latch grooves of the base panel to enable the display panel to be moved into the open position.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1A:
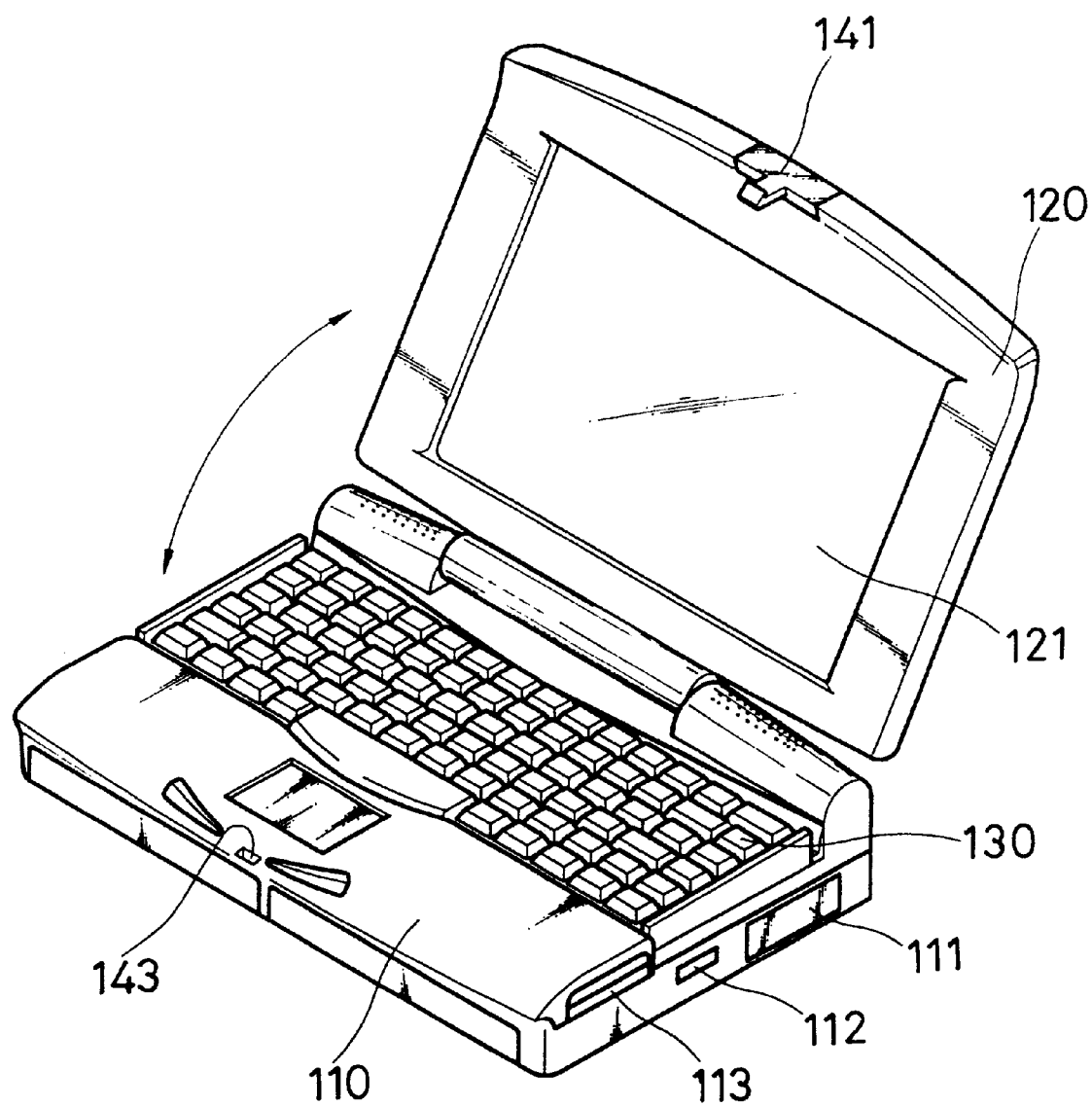
FIG. 1A is a perspective view of a portable computer equipped with a typical single latch type of locking mechanism.
Figure 1B:
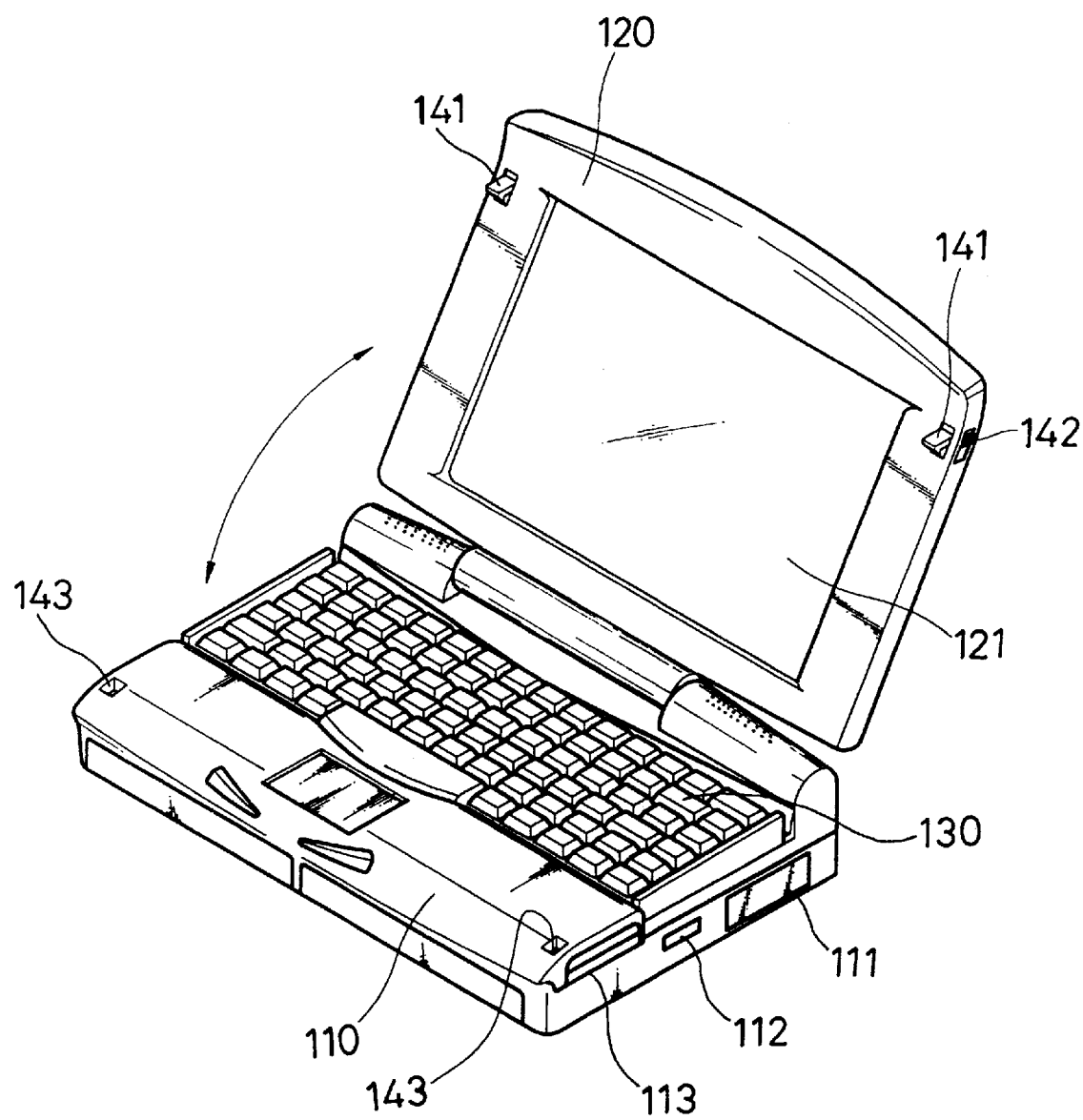
FIG. 1B is a perspective view of a portable computer equipped with a typical two latches type of locking mechanism.

Referring now to the drawings and particularly to FIGS. 1A and 1B, which illustrate a portable computer such as a laptop or notebook computer equipped with a typical single latch type of locking mechanism and a typical two latches type of locking mechanism. Referring to FIG. 1A, the portable computer equipped with a single latch type of locking mechanism includes a main base panel 110 supporting a keyboard 130, and a display panel 120 supporting a liquid crystal display (LCD) 121 pivotally mounted on one side of the base panel 110 for movement between an open position and a closed position. On one side surface of the main base panel 110, a hard disk unit 111 containing a hard disk drive, a rechargeable battery latch 112 is installed for facilitating insertion and detachment of a rechargeable battery, and a PCMCIA card slot 113 is installed for attaching peripheral devices.

A single latch type of locking mechanism is provided for closing the display panel 120 with respect to the main base panel 110. The locking mechanism includes a latch 141 installed at the mid-portion of one side of the display panel 120 and a latch groove 143 provided at the opposite position on the upper surface of the main base panel 110. When the display panel 120 is closed, the latch 141 is inserted into the latch groove 143 to be locked. This type of locking mechanism is, however, susceptible to damage when the latch 141 is pressed erroneously or due to an unexpected impact during transportation which may undesirably open the display panel 120 from the base panel 110. In addition, since the display panel 120 is locked to the main base panel 110 by a single latch 141, the display panel 110 may be displaced with respect to the main base panel 110.

Referring to FIG. 1B, a portable computer equipped with a typical two latches locking mechanism also includes a main base panel 110 supporting a keyboard 130, and a display portion 120 supporting a liquid crystal display (LCD) 121 pivotally mounted on one side of the base panel 110 for movement between an open position and a closed position. On one side surface of the main base panel 110, a hard disk unit 111 containing a hard disk drive, a rechargeable battery latch 112 is installed for facilitating insertion and detachment of a rechargeable battery, and a PCMCIA card slot 113 is installed for attaching peripheral devices.

As a locking mechanism, two latches 141 are installed at opposite side edges of the display panel 120 and two latch slides 142 for operating the latches 141 are installed adjacent to the latches 141. Also, two latch grooves 143 are installed at the corresponding positions to the latches 141 on the upper surface of the main base panel 110. To open the display panel 120 with respect to the main base panel 110, each of the two latch slides 142 are slid in one direction to release the respective latches 141 from the latch grooves 143. However, as I have observed that since both latch slides 142 installed on both sides of the display panel 120 must be operated and both hands must be used simultaneously to open the portable computer, such requirement can be burdensome and extremely inconvenient.

Figure 2:
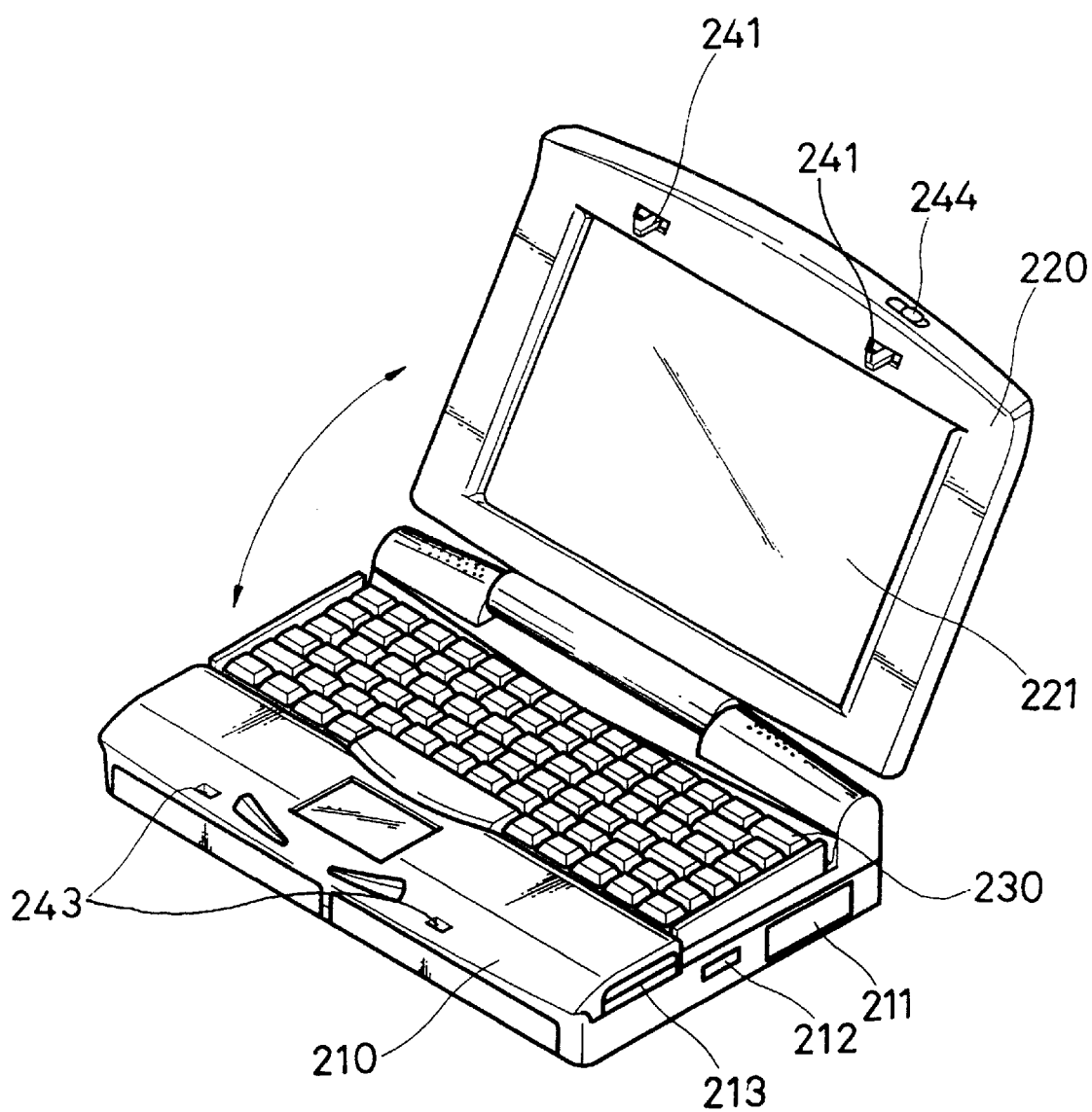
FIG. 2 is a perspective view of a portable computer with a locking mechanism having a plurality of latches according to a preferred embodiment of the present invention.

Turning now to FIG. 2, which illustrates a portable computer with a locking mechanism constructed according to a preferred embodiment of the present invention. The computer includes a main base panel 210 supporting a keyboard 230, and a display panel 220 supporting a liquid crystal display (LCD) 221 pivotally mounted on one side of the base panel 210 for movement between an open position and a closed position. On one side surface of the main base panel 210, a hard disk unit 211 containing a hard disk drive, a rechargeable battery latch 212 is installed for facilitating insertion and detachment of a rechargeable battery, and a PCMCIA card slot 213 is installed for attaching peripheral devices.

The locking mechanism according to the present invention includes two latches 241 installed at an upper portion of the front surface of the display panel 220 separated a predetermined distance from each other, two latch grooves 243 formed at corresponding positions to the two latches 241 on the upper surface of the main base panel 210, and a slide knob 244 operatively connected to the two latches 241 for concurrently operating the two latches 241 installed on the upper side of the display panel 220.

Figure 3:
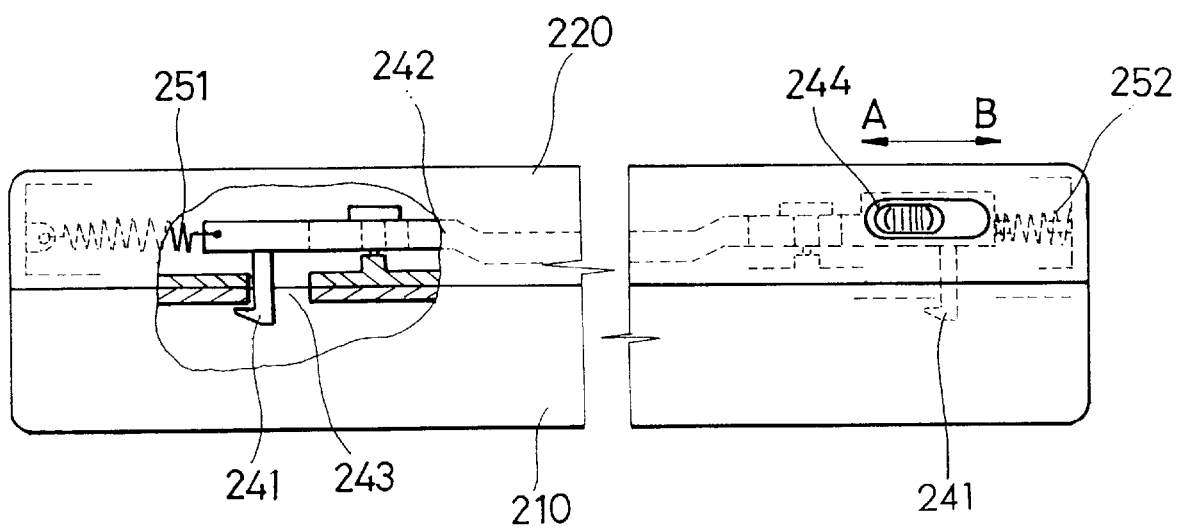
FIG. 3 is a partially cut-away front view of the locking mechanism of the portable computer as shown in FIG. 2, when a display panel is closed.

FIG. 3 provides a partially cut-away view of the locking mechanism of the portable computer when the display panel 220 is closed. Likewise, FIG. 4 provides an exploded, perspective view of the locking mechanism as shown in FIG. 3.

Figure 4:
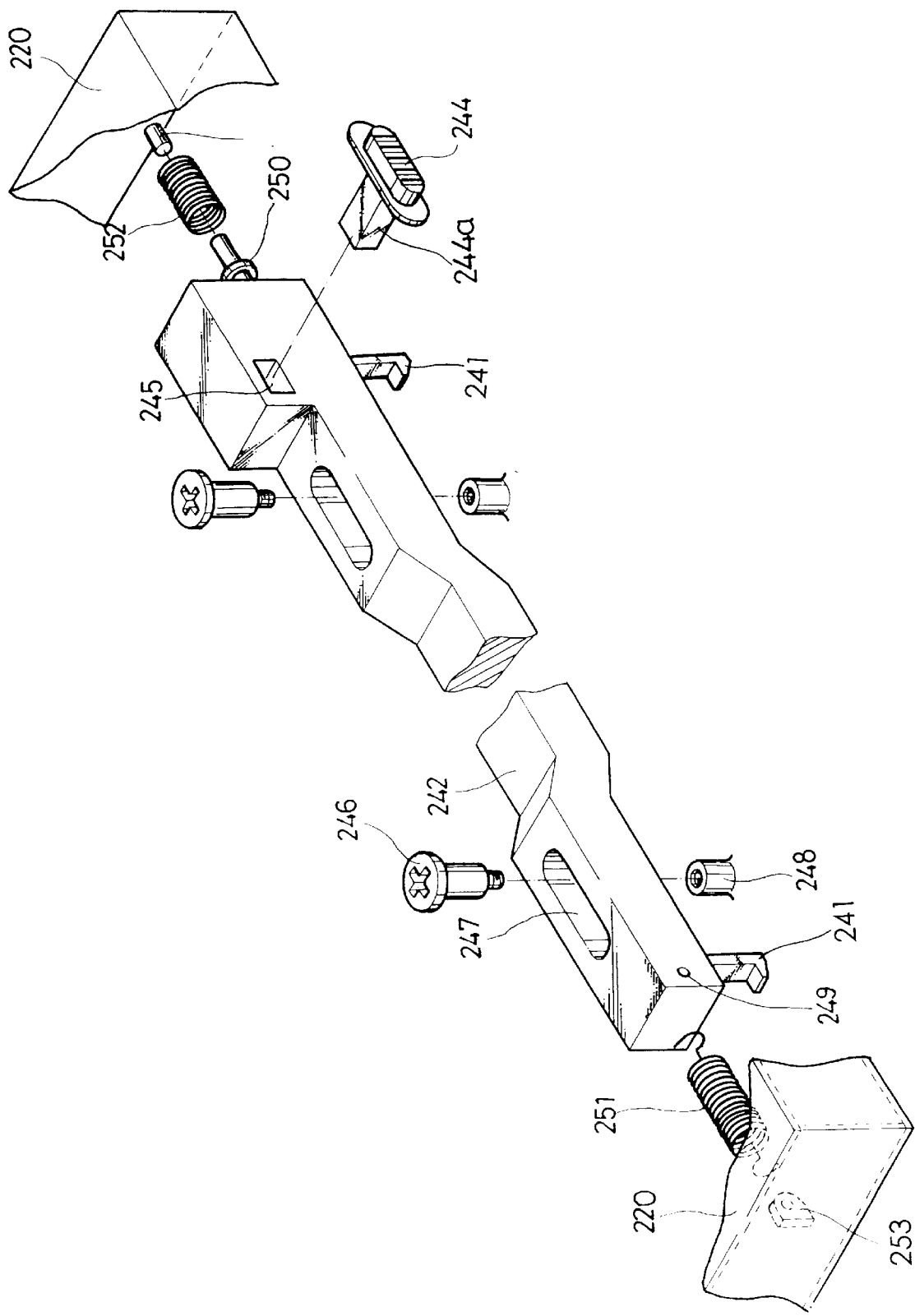
FIG. 4 is an exploded, perspective view of the locking mechanism of the portable computer as shown in FIG. 3.

Referring to FIGS. 3 and 4, a latch frame 242 having the two latches 241 is installed inside the display panel 220 to be capable of reciprocating in a widthwise direction with respect to the main base panel 210. The latches 241 are formed to protrude from both ends of the latch frame 242. Two latch grooves 243 are formed at positions corresponding to the latches 241 on the upper surface of the main base panel 210 so that the two latches 241 are inserted into the two latch grooves 243 to be locked when the portable computer is closed.

A single latch slide knob 244 is operatively connected to the latch frame 242 and is installed at one side surface of the display panel 220 for operating the latch frame 242 to move along the widthwise direction of the display panel 220. The latch slide 244 has a protrusion 244a which is Coupled to a slide coupling hole 245 formed at a predetermined position on the latch frame 242. In order to support reciprocal movements of the latch frame 242 as described above, slots 247 of a predetermined length for guiding the movements of the latch frame 242 are formed through the latch frame 242. Guide rods 246 are respectively inserted into the slots 247 and coupled to bosses 248 formed to protrude from the inner surface of the display panel 220. Thus, if the latch slide 244 coupled to the latch frame 242 is pushed in a direction B shown in FIG. 3, the two latches 241 are released from the latch grooves 243 to open the display panel 220.

The latch frame 242 is preferably supported by an elastic member such as a compression coil spring for maintaining the latch 241 in a closed state. In particular, it is preferable that the elastic member is of a double-spring structure including a tension spring 251 installed at one end of the latch frame 242 and a compression spring 252 installed at the other end of the latch frame 242.

The tension spring 251 is connected between a spring coupling hole 249 formed on one end portion of the latch frame 242 and a spring coupling protrusion 253 provided on the inner side surface of the display panel 220, to thereby pull the latch frame 242 in a direction A shown in FIG. 3. The compression spring 252 for pushing the latch frame 242 in the direction A is installed between a protrusion 250 formed on the other end portion of the latch frame 242 and a spring coupling boss 254 provided on the inner surface of the right side of the display panel 220. Thus, since the latch frame 242 is biased in the direction A by elastic forces of the tension spring 251 and the compression spring 252, the latch 241 is normally kept in a locked state.

Thus, the latch slide knob 244 is pushed in the direction B in order to open the display panel 220. When the display panel 220 is closed, since the latch frame 242 receives elastic forces by the tension spring 251 and the compression spring 252 in the direction A, the latch 241 is automatically locked into the latch groove 243.

Figure 5:
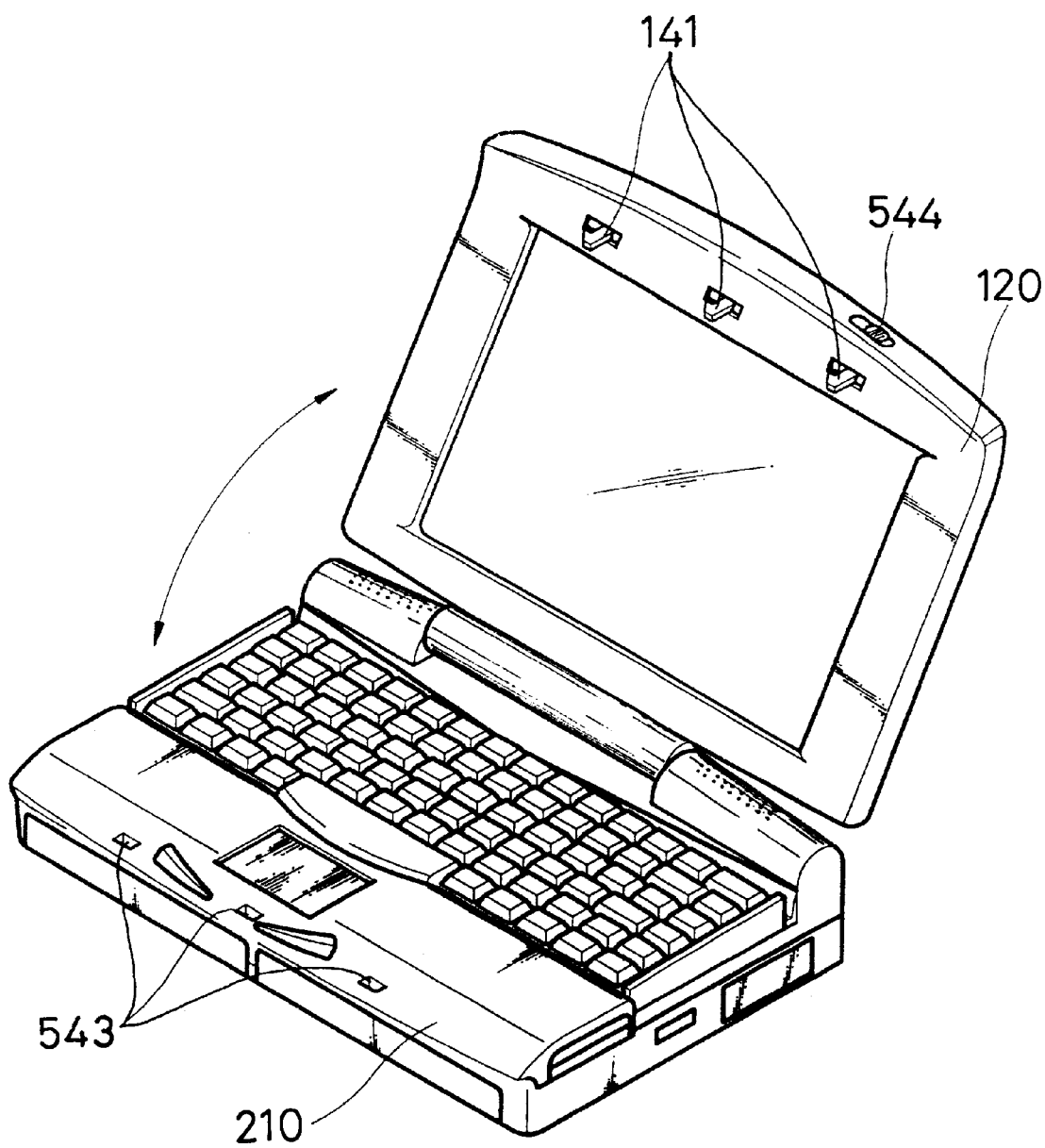
FIG. 5 is a perspective view of a portable computer with a locking mechanism having a plurality of latches according to another preferred embodiment of the present invention.

FIG. 5 illustrates a locking mechanism constructed in accordance with another preferred embodiment of the present invention. Referring to FIG. 5, at least three latches 541 are installed at the upper portion of the front surface of the display panel 220 at predetermined intervals and three latch grooves 543 are formed at positions corresponding to the three latches 541 on the upper surface of the main base panel 210. A single latch slide knob 544 for concurrently operating the three latches 541 is installed on the upper side of the display panel 220.

As described above, in the portable computer having a locking mechanism according to the principles of the present invention, since a plurality of latches are provided and elastic forces are applied by double springs, the display panel of the portable computer is kept stable with respect to the main base panel and is not easily opened by external impacts. In addition, since a plurality of latches are coupled to a single latch frame, the latches can be concurrently operated by a single latch slide knob so that the opening/closing operation of the portable computer is facilitated.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. In a portable computer having a generally rectangular base panel supporting a keyboard and having a lengthwise edge: a display panel adapted to move between an open position when the portable computer is open, and a closed position when the portable computer is closed; and a locking mechanism pivotally connecting the display panel to the base panel along said lengthwise edge, said locking mechanism comprising:

a latch frame adapted to be installed in said display panel for movement along a widthwise direction of said display panel;

said latch frame having a travel axis generally parallel to said lengthwise edge; and a plurality of latches formed on said latch frame at a predetermined interval and protruding through a front surface of said display panel, said latches being concurrently movable between a latch position adapted to engage corresponding latch grooves formed on said base panel to enable said display panel to be secured in the closed position, and a release position adapted to be disengaged from the corresponding latch grooves of said base panel to enable said display panel to be moved into the open position;

the improvement comprising a locking mechanism wherein:

a slide knob is operatively connected to said latch frame, for sliding the latch frame along the widthwise direction of said display panel to move the latches between (a) the latch position adapted to engage corresponding latch grooves formed on said base panel to enable said display panel to be secured in the closed position, and (b) the release position adapted to be disengaged from the corresponding latch grooves of said base panel to enable said display panel to be moved into the open position and said latch frame is elastically supported to float longitudinally along said travel axis between a tension spring installed at a first end portion of said latch frame and a compression spring installed at a second end portion of said latch frame, whereby said latches are kept in a locked state when said display panel is in the closed position.

2. The apparatus of claim 1, wherein slots for guiding movements of said latch frame are formed on said latch frame and a guide rod inserting into said slot is coupled to a boss formed on an inner surface of said display panel.

3. The apparatus of claim 1, wherein said plurality of latches correspond to at least two latches mounted separately on the latch frame for movement between the latch position and the release position.

4. A computer system, comprising:

a base panel supporting a keyboard;

a display panel pivotally mounted on the base panel at a lengthwise edge of said base panel, for movement between an open position and a closed position; and a locking mechanism provided at the display panel for locking the display panel in the closed position when the display panel is moved to the closed position, and for releasing the display panel from the closed position when the display panel is moved to the open position, said locking mechanism comprising:

a latch frame installed in said display panel for movement along a widthwise direction of said display panel, said latch frame having a travel axis generally parallel to said lengthwise edge of said base panel, and being elastically supported to float longitudinally along said travel axis between a tension spring installed at a first end portion of said latch frame and a compression spring installed at a second end portion of said latch frame, whereby said latches are kept in a locked state when said display panel is in the closed position;

a plurality of latches formed on said latch frame at a predetermined interval and protruding through a front surface of said display panel, said latches being concurrently movable between a latch position and a release position; and a slide knob operatively connected to said latch frame, for sliding the latch frame along the widthwise direction of said display panel to move the latches between the latch position adapted to engage corresponding latch grooves formed on said base panel to enable said display panel to be secured in the closed position, and the release position adapted to disengage from the corresponding latch grooves of said base panel to enable said display panel to be moved into the open position.

5. The computer system of claim 4, wherein slots for guiding movements of said latch frame are formed on said latch frame and a guide rod inserting into said slot is coupled to a boss formed on an inner surface of said display panel.

6. The computer system of claim 4, wherein said plurality of latches correspond to at least two latches mounted separately on the latch frame for movement between the latch position and the release position.

7. In a portable computer locking mechanism which pivotally connects a display panel of a portable computer to a base panel of the portable computer at a lengthwise edge of the base panel, said locking mechanism comprising:

a latch frame adapted to be installed in said display panel for movement along a widthwise direction of said display panel and having a travel axis generally parallel to said lengthwise edge; and a plurality of latches formed on said latch frame at a predetermined interval and protruding through a front surface of said display panel, said latches being concurrently movable between (a) a latch position adapted to engage corresponding latch grooves formed on said base panel to enable said display panel to be secured in the closed position, and (b) a release position adapted to be disengaged from the corresponding latch grooves of said base panel to enable said display panel to be moved into the open position;

the improvement in said locking mechanism comprising:

a slide knob operatively connected to said latch frame, for sliding the latch frame along the widthwise direction of said display panel to move the latches between (a) the latch position adapted to engage corresponding latch grooves formed on said base panel to enable said display panel to be secured in the closed position, and (b) the release position adapted to disengage from the corresponding latch grooves of said base panel to enable said display panel to be moved into the open position; and a latch frame support for elastically supporting the latch frame to float longitudinally along said travel axis between a tension spring installed at first end portion of said latch frame and a compression spring installed at a second end portion of said latch frame.

8. A method for simultaneously locking and simultaneously unlocking a plurality of latches in a portable computer having a base panel and a display panel pivotally connected to the base panel along a lengthwise edge thereof, said display panel adapted to latch to and unlatch from the base panel, said method comprising:

(1) providing the display panel of the portable computer with a latch frame which has a plurality of latches formed thereon and which is elastically supported to float longitudinally along a travel axis generally parallel to said lengthwise edge, between a tension spring installed at a first end portion of said latch frame and a compression spring installed at a second end portion of said latch frame; and (2) sliding the latch frame along a widthwise direction of said display panel to move the plurality of latches between:

(a) a first latch position adapted to engage corresponding latch grooves formed on the base panel to enable the display panel to be secured in a closed and latched position; and (b) a second latch position adapted to disengage from corresponding latch grooves of the base panel to enable the display panel to be moved into an open and unlatched position.

\* \* \* \* \*